(12) United States Patent
Wohlfeil

(10) Patent No.: US 11,312,110 B2
(45) Date of Patent: Apr. 26, 2022

(54) VEHICLE PANE, VEHICLE, AND METHOD FOR PRODUCING SAME

(71) Applicant: SAINT-GOBAIN GLASS FRANCE, Courbevoie (FR)

(72) Inventor: Dirk Wohlfeil, Raeren (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 45 days.

(21) Appl. No.: 16/961,086

(22) PCT Filed: Nov. 21, 2018

(86) PCT No.: PCT/EP2018/082005
§ 371 (c)(1),
(2) Date: Jul. 9, 2020

(87) PCT Pub. No.: WO2019/137674
PCT Pub. Date: Jul. 18, 2019

(65) Prior Publication Data
US 2020/0398536 A1    Dec. 24, 2020

(30) Foreign Application Priority Data

Jan. 11, 2018  (EP) .................................. 18151114

(51) Int. Cl.
*B32B 7/12*  (2006.01)
*B32B 17/10*  (2006.01)
(Continued)

(52) U.S. Cl.
CPC .. *B32B 17/10266* (2013.01); *B32B 17/10036* (2013.01); *B32B 17/10146* (2013.01);
(Continued)

(58) Field of Classification Search
CPC .................... B32B 17/10266; B32B 17/10036
See application file for complete search history.

(56) References Cited

U.S. PATENT DOCUMENTS 5,443,669 A    8/1995  Tuenker
2009/0130395 A1  5/2009  Lyon et al.
(Continued)

FOREIGN PATENT DOCUMENTS

DE    699 06 366 T2    12/2003
EP    2 121 308 B1    2/2016
(Continued)

OTHER PUBLICATIONS

International Search Report as issued in International Patent Application No. PCT/EP2018/082005, dated Feb. 19, 2019.

*Primary Examiner* — Elizabeth E Mulvaney
(74) *Attorney, Agent, or Firm* — Pillsbury Winthrop Shaw Pittman LLP

(57) ABSTRACT

A vehicle pane has a first and a second pane element that are joined to one another surface-to-surface such that the vehicle pane has a first pane face, a second pane face, a third pane face, and a fourth pane face. The second pane face has a first printed region and the third or fourth pane face has a second printed region for forming a viewing region along the vehicle pane. The first and second printed region are each designed with at least a first, second, and third zone. At least one of the first and/or second zones is at least partially printed and the third zones are not printed. The second zones are implemented as a transition region between the first zone and the third zone such that an optical effect of the first printed region is compensated by an optical effect of the second printed region.

16 Claims, 7 Drawing Sheets

Figure 1:
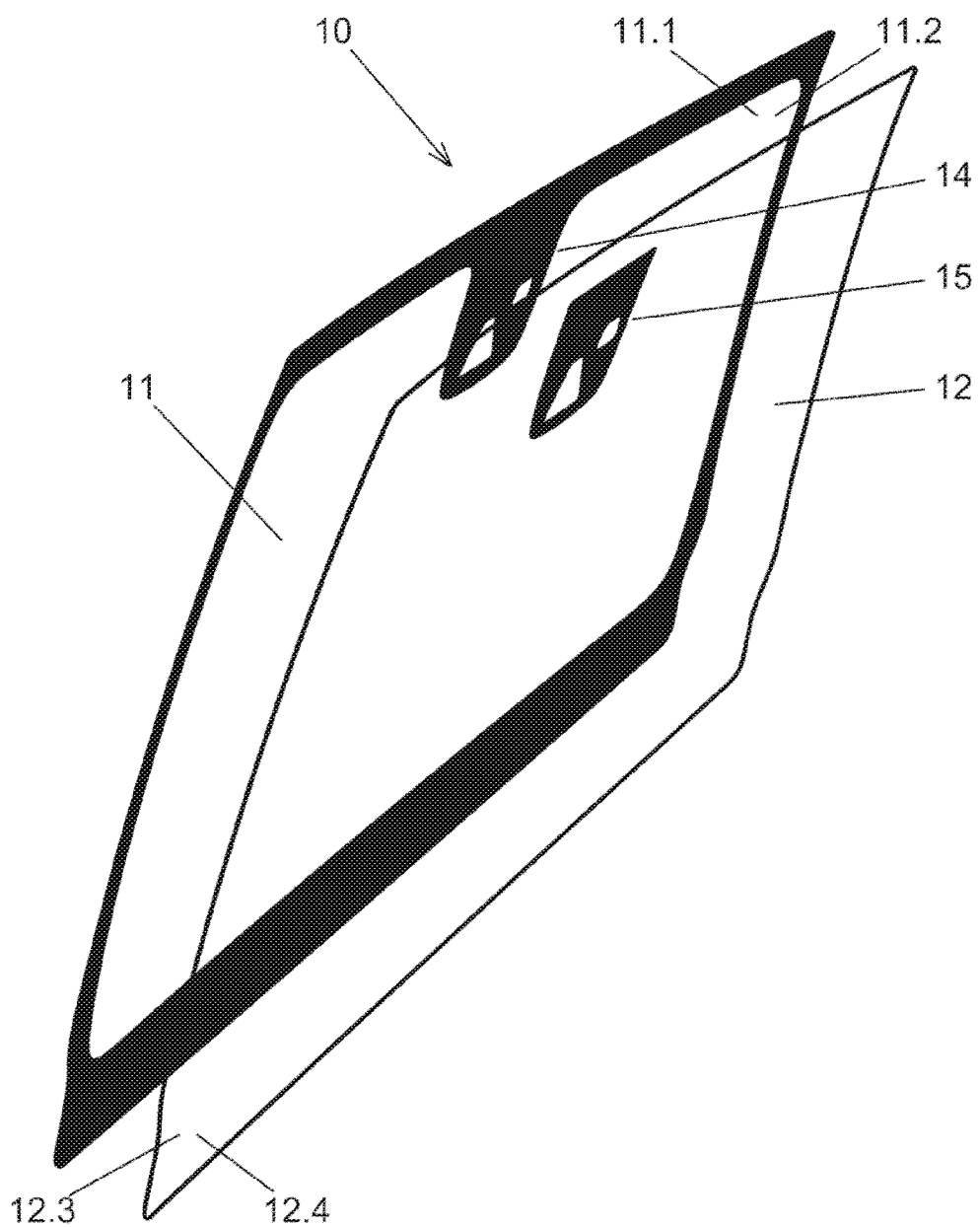

(51) Int. Cl.
*B32B 38/00* (2006.01)
*B63B 19/00* (2006.01)
*B60J 1/00* (2006.01)
*B61D 25/00* (2006.01)

(52) U.S. Cl.
CPC ............ *B32B 38/145* (2013.01); *B63B 19/00* (2013.01); *B32B 2307/418* (2013.01); *B32B 2605/006* (2013.01); *B60J 1/001* (2013.01); *B61D 25/00* (2013.01); *B63B 2019/0007* (2013.01)

(56) References Cited

U.S. PATENT DOCUMENTS

2016/0243796 A1    8/2016   Mannheim et al.
2019/0030865 A1*   1/2019   Aoki ................ B32B 17/10357

FOREIGN PATENT DOCUMENTS

| JP | H11-335141 A | 12/1999 |
| JP | 2001-354447 A | 12/2001 |
| JP | WO 2007/052600 A1 | 5/2007 |
| JP | 2016-515989 A | 6/2016 |
| JP | 2017-122022 A | 7/2017 |
| WO | WO 2015/137518 A1 | 9/2015 |
| WO | WO 2015/170771 A1 | 11/2015 |
| WO | WO 2017/068368 A1 | 4/2017 |

* cited by examiner

VEHICLE PANE, VEHICLE, AND METHOD FOR PRODUCING SAME

CROSS-REFERENCE TO RELATED APPLICATIONS

This application is the U.S. National Stage of PCT/EP2018/082005, filed Nov. 21, 2018, which in turn claims priority to European patent application number 18 151 114.8 filed Jan. 11, 2018. The content of these applications are incorporated herein by reference in their entireties.

The invention relates to a vehicle pane, a vehicle having a vehicle pane, and a method for producing a vehicle plane.

Known from the prior art, for example, from EP 2 121 308 B1, are vehicle panes having sensors. As described in EP 2 121 308 B1, these sensors can even be integrated into the vehicle pane (between individual layers of the vehicle pane).

In general, the known solutions for vehicle panes that can be designed with sensors, among other things, are perceived to be relatively prone to failure.

During the production of a vehicle pane, a bending process is carried out under thermal influence. The vehicle pane can have different temperatures along transparent regions and printed or black-printed regions such that the bending behavior can vary along the vehicle pane. As a result, for example, transparent regions and black-printed regions of the vehicle pane can have different bending radii.

Significant distortions along the vehicle plane result from such deviations or variations in the bending radii. So-called "focal lines" are present along the boundaries between transparent and black-printed regions of the vehicle pane.

The focal lines cause diffraction of light such that an optical distortion occurs. The occurrence of focal lines as an optical property or optical effect can, consequently, exert considerable influence, for example, on the accuracy of the optical sensors. Moreover, such distortions in the edge regions of the vehicle pane can also be perceived by a driver and at least interfere with the overall impression.

Black print areas are provided along sensor arrangements on vehicle panes for aesthetic reasons, among other things, for example, to conceal adhesive sites for attaching the sensor units.

The object of the invention is thus to provide a vehicle pane that conveys an aesthetic, distortion-free appearance, can be produced economically, and provides improved optical properties.

The object of the present invention is accomplished according to the invention by a vehicle pane in accordance with the independent claim 1. A production method is indicated by another independent claim. Advantageous embodiments and further developments emerge from the dependent claims and from the description with reference to the drawings.

The vehicle pane according to the invention, in particular for a motor vehicle, a bus, a train, or a ship, is provided with at least one first pane element and a second pane element that are joined to one another surface-to-surface such that the vehicle pane has a first pane face, a second pane face, a third pane face, and a fourth pane face. The second pane face has a first printed region, and the third or fourth pane face have a second printed region for forming a viewing region along a vehicle pane. The first and second printed region are designed in each case with at least a first, second, and third zone, wherein at least one of the first and/or second zones at least is partially printed and the third zones are, in all cases, not printed, and wherein the second zones are in each case implemented as a transition region between the first zone and the third zone such that at least one optical effect of the first printed region can be compensated, is preferably compensated, by an optical effect of the second printed region.

The invention is based on the idea that the first and second pane elements of a vehicle pane are designed in each case with printed regions such that optical effects or optical properties that occur cancel each other out or compensate each other.

By designing the first printed region and the second printed region with different adapted or coordinated zones, compensation of optical effects or properties can be carried out such that, for example, a focal line or optical diffraction within the vehicle pane can be compensated. In particular, mutually corresponding optical effects are to be provided such that, in sum, they preferably cancel each other out.

By being able to cancel out or reduce optical effects or properties along the vehicle pane, in particular in a viewing region of a driver and/or of an optical sensor or of a sensor arrangement, it is possible to achieve at least a distortion-free appearance, pleasant viewing conditions for a driver, and/or improved accuracy or reproducibility of the outputs of sensors or sensor arrangements.

Thus, in particular, provision is made with the present invention to be able to provide a vehicle pane having advantageous optical properties for use with an optical sensor.

Moreover, provision can be made with the present invention to be able to provide a vehicle pane with advantageous optical properties for a vehicle driver.

The vehicle pane according to the invention has at least one first pane element and one second pane element joined to one another surface-to-surface such that the vehicle pane is designed with a first pane face, a second pane face, a third pane face, and a fourth pane face.

Preferably, the first and second pane element are arranged atop one another by lamination and bonded together. Thus, a laminating layer can be provided between the first and second pane element. This corresponds to a commonly used procedure for providing pane elements bonded together for a vehicle pane.

The laminated pane elements provide a basic structure for an optical system of a vehicle pane.

The bonded pane elements make available a total of four pane faces. The first pane face is the outer side of the vehicle pane. The fourth pane face is the inner side of the vehicle pane.

The second and third pane face are arranged facing one another with a laminating layer possibly provided therebetween.

The second pane face has a first printed region and the third or fourth pane face has a second printed region for forming a viewing region along a vehicle pane, e.g., for at least one optical sensor.

The present invention provides for designing a vehicle pane or a viewing region along a vehicle pane having advantageous optical properties. This relates to both a driver of a motor vehicle, a ship, or the like, and to the use of sensors or optical sensors. By way of example, the present invention is to be explained in the following, in particular, in terms of the use of optical sensors, with the same explanations applying to a vehicle driver.

In the context of the present invention, a "printed region" can mean, in particular, a region of a pane face or of a pane element, which can, for example, be expediently coated by black printing or screen printing, in particular can be partially coated.

A printed region can thus have continuously printed regions or zones, partially printed regions, and non-printed regions.

The second printed region can be arranged along the third or fourth pane face. Preferably, and set forth in the following by way of example, the second printing region is arranged on the fourth pane face.

In this sense, a third printed region, for example, can also be provided on the third pane face.

In the context of the present invention, the "viewing region" can be understood to be that region of a vehicle pane that influences the optical properties or circumstances or conditions of a sensor measurement or of the field of vision of a vehicle driver.

Depending on the application or the individual case, both central regions and peripheral regions of a vehicle plane can be allocated to the viewing region. Whereas a viewing region in the central sections of the vehicle pane is primarily to be allocated to a sensor, the viewing region of a driver can include the entire area of the vehicle pane including the edges.

Thus, the "viewing region" can be defined as that region in which the sensor or the sensor arrangement can "see" optical effects or optical properties of a vehicle pane, i.e., in which the measurement results of the respective sensor are influenced.

Accordingly, the "viewing region" refers, for example, not merely to a, for example, transparent region of the vehicle pane through which electromagnetic radiation can pass during the course of an optical measurement. Instead, in the context of the present invention, the "viewing region" also describes surrounding or peripheral regions that can, in particular, influence the refractive power of the first and/or second pane element along the optical axis of the at least one sensor.

In accordance with the present invention, the first and second printed region are in each case designed with a first, second, and third zone, wherein at least one of the first and/or second zones (14.1; 14.2; 15.1; 15.2) is at least partially printed and the third zones are, in all cases, not printed, and wherein the second zones are, in each case, implemented as a transition region between the first zone and the third zones such that at least one optical effect of the first printed region can be compensated by an optical effect of the second printed region.

In terms of their design, the first and second printed region are in each case divisible into three zones. In the context of the present invention, these zones can be regarded as surface regions or surface sections preferably distinguishable from one another in a viewing region of the optical sensor.

The first zone is a zone that contributes to the definition of a global, optical behavior of the vehicle pane. Preferably, the first zone has printing, in particular black printing. Alternatively, the first zone can be at least partially non-printed.

The second zone is a transition region between the first zone and the third zone. Thus, the second zone can be regarded as a printed region, in particular as a partially printed region, in order to provide a transition between the first and third zone.

Alternatively, the second zone can be provided integrated into a first zone.

In this sense, the second zone can be a progressive, gradual, or soft transition or an abrupt, immediate, hard, or infinitesimally short transition between the first and third zone.

The third zone is always designed as a transparent zone of the first and second printing surface. Since the third zone is transparent or non-printed, it constitutes a region of the first and second printing surface, through which, for example, an optical sensor or a vehicle driver can expediently look. Thus, the third zone can be regarded as that region that is framed by the first and/or second zone.

The compensation of optical effects or properties using the first and second printed region means, in particular, that, for example, diffraction caused by the first printed region can be canceled out by an inverted or corresponding diffraction of the second printed region.

In particular, in the context of the present invention, the "compensation of an optical effect" means the compensation of an optical distortion such that there is a completely or almost completely distortion-free vehicle pane.

Preferably, by means of the second printed region, an inverted optical effect can be achieved that corresponds in magnitude to an optical effect of the first printed region in this sense.

Thus, for example, the first pane elements form a collecting lens or concave lens with the first printed region, while the second pane element forms a diverging lens or convex lens with the second printed region such that in the combination of the first and second pane elements, there is a neutral optical system.

In the context of the present invention, the "compensation of at least one optical effect" can be understood to mean the targeted cancellation of optical effects using opposing, optically inverting components.

The completely assembled beam path through the vehicle pane preferably exerts no or almost no influence on the optical radiation passing through. In this sense, the beam path provided by the vehicle pane according to the invention can be regarded as a neutral beam path.

It is possible to transfer optical radiation through the vehicle pane unaffected or almost unaffected.

In this context, "compensation by a screen print or a black print" can also mean overcompensation or undercompensation of optical effects such that the entire optical system has, for example, no or almost no refractive power.

Such overcompensation can enable not only canceling out the optical effects or distortions caused in particular by a screen print or a black print, but, instead, also compensating additional optical effects of the vehicle pane as an overall optical system.

Alternatively, a screen print or a black print in the form of undercompensation can be provided for the cancellation of only part of the optical effects such that the sum of optical effects of the overall system in turn has no or almost no optical distortions.

Thus, by means of need-based overcompensation with the present invention, preferably all and almost all optical effects within an overall optical system of a driver, a sensor, or an optical sensor or the like can be canceled out.

In general, with the present invention, optical impairment or distortion of measurement results due, for example, to focal lines or diffraction effects can be avoided.

Moreover, other factors can adversely affect the optical properties or conditions of a vehicle pane. In particular, the thickness of the individual pane elements or the vehicle pane as a whole, the color of the pane elements, the laminating layer between the at least two pane elements, or coatings on or between the pane elements can exert an influence on the optical conditions in the context of the present invention.

Thus, in the context of the present invention, provision can be made to design the first and/or second printed region such that the overall optical system of the vehicle pane has no or almost most no optical effect, in particular no optical refractive power; and, thus, a neutral optical system can be provided.

For example, the pane elements can have different or identical thicknesses. In particular, pane thicknesses that correspond to the dimensions customarily used in the motor vehicle sector are provided. Also, the use of thin glass for one pane element or for both pane elements, e.g., with thicknesses less than or equal to 1.2 mm, preferably less than or equal to 1.0 mm, and particularly preferably from 0.6 mm to 1.0 mm, is conceivable.

As to the color of individual pane elements, provision can be made for at least one of the pane elements to to be colored green, blue, white, or to have another coloration customary in the motor vehicle sector.

Moreover, coatings along the pane faces, in particular along the second, third, or fourth pane face, are conceivable, such as an infrared reflecting coating or a heat radiation reducing coating (low emissivity coating).

For example, an infrared reflecting coating can be provided even within a laminating layer between the two pane elements. Thus, implementation of a laminating layer in the form of two polyvinyl butyral layers (PVB layers) or films is conceivable. An infrared reflecting or infrared absorbing intermediate layer can be provided between the two PVB layers such that there is a sandwich construction.

In addition, the specific design of the printed regions can be adapted to other factors in terms of shape and form of printing, such as covering the adhesive sites of a sensor or a sensor unit, providing a printed surface as an adhesive surface for other components or the like.

In summary, the present invention provides for targeted adaptation of the first and second printed surface to the conditions of a vehicle pane in order to compensate optical effects or properties and, in particular, to be able to provide a distortion-free vehicle pane.

According to one embodiment, provision is made to be able to compensate a refractive power as an optical property of the first pane element in the first printed region by a refractive power as an optical property of the second pane element (12) in the second printed region.

In particular, the occurrence of a focal line at a transition between an at least partially black-printed zone and a transparent zone of a printed region can be reduced or avoided. In this sense, optical diffraction can be counteracted by the second printed region having an inverted refractive power corresponding in magnitude to the refractive power of the first printed region.

According to another embodiment, the first zone of the first printed region is printed either continuously or with a pattern of individual elements.

"Continuous printing" means, in particular, a complete coating of the surface during a printing process, such as a screen printing process. In this case, the first zone is, in the case of a black print, completely inked or coated in black. Thus, maximum absorption of incident electromagnetic radiation and opacity of the first zone are achieved.

A pattern is created by a recurring arrangement of individual elements relative to one another.

In one embodiment, the second zone of the first printed region is designed at least partially as a pattern of printed individual elements.

In this sense, the second zone can have regions that are completely printed or are not printed. In addition, the second zone of the first printed region has at least one sub-area that is equipped with a pattern of individual elements.

The design of the second zone of the first printed region can be provided such that the second zone is supplemented by the first zone and/or the third zone. The second zone can surround the third zone only partially in order to provide a transition between the first and third zone in this region.

The specific design of the first, second, and third zones of the first and second printed region is always oriented toward the final optical result to be achieved, which results from a combination of the first and second pane elements.

In this sense, the implementation of the first, second, and third zones of the first and second printed region can be varied and mutually coordinated as needed.

In another embodiment, the first zone of the second printed region is printed continuously or with a pattern of individual elements or not printed.

Thus, the first zone of the second printed region can, like the first zone of the first printed region, be designed completely opaque or printed in a pattern.

According to one embodiment, the second zone of the second printed region is designed at least partially as a pattern of individual elements. In this sense, the second zone along the second printed region or the second pane element can be regarded as a transition region between the associated first and third zone.

The second zone of the second printed region can be printed with a pattern of individual elements such that, for example, optical diffraction can be canceled out in connection with the first printed region of the first pane element.

In this manner, an optical effect of the first pane element can be compensated by a corresponding optical effect of the second pane element.

According to another embodiment, the first zone and/or the second zone of the first printed region and/or of the second printed region is designed at least partially identical to the respective associated third zone.

Any expedient variation of printed and non-printed regions or zones can be used. In particular, individual zones can also transition into one another and are not strictly geometrically delimitable from one another. In this sense, in particular, first and second zones can be regarded as at least partially integrated into one another or identical.

For example, the third zone of the second printed region can be designed identical to the associated third zone as non-printed and thus transparent.

Furthermore, for example, the second zone of the first printed region can be partially non-printed, like the associated first zone.

According to another embodiment, the pattern of individual elements of the first zone and/or of the second zone of the second printed region can be a gradient pattern.

The term "gradient pattern" can, in particular, mean that the characteristics of the printed pattern change across the printed area. For example, the size of the individual elements, the distance between the individual elements, the shape of the individual elements, the coloration of the printed individual elements, or a comparable characteristic can vary along the relevant printing area.

In this sense, the pattern of individual elements can change or very along the surface of the first and/or second zone of the second printed region.

Furthermore, such a gradient pattern can generally be provided for any zone of the first and/or second printed region.

In one embodiment, provision is made for the first and second zones of the first and second printed region to be implemented at least partially in the form of a black print.

In this sense, it is possible to design the first and second zones in each case individually and adapted with a black print such that, in particular, effects such as a refractive power in the optical system of the vehicle pane can be compensated. The vehicle pane preferably has no almost no optical effect, e.g., in the form of a refractive power.

In addition, the black print can be provided as an aperture for the functionally distortion-free design of the vehicle pane.

According to one embodiment, the first printed region and the second printed region can be designed in each case as a screen print.

Thus, by means of the screen printing process, economical duplication of the first and second printed region for mass production of vehicle windows according to the invention is possible.

Furthermore, during a screen printing process, provision can be made to apply other functional layers in addition to or instead of a black print along one of the pane faces of the vehicle pane. At least one of the pane faces can be coated with elements for realizing, for example, a heating or antenna function or another functionalization.

For example, an infrared reflecting coating or an electrically conductive coating for implementing pane, camera, or sensor heating is conceivable. Also possible is the design of a coating for reducing heat radiation, a so-called "low-immensity" coating and any other functionalizing coating is conceivable.

In particular, such functionalizing coatings can be arranged on the third or fourth pane face, preferably on the third pane face. A low-emissivity coating is preferably arranged on the fourth pane face.

In one embodiment, the individual elements for a printed pattern made up of individual elements have the geometric shape of a circle, a rectangle, a square, a rhombus, a hexagon, an octahedron, or the like.

The embodiment with a pattern of individual elements describes in particular the printing with a large number of elements that can preferably be designed at will or as needed.

In a coordinate aspect of the invention, a vehicle, in particular a motor vehicle, preferably a passenger car or a truck, a bus, a train, or a ship is provided with a vehicle pane according to one of the preceding claims.

Accordingly, the vehicle pane according to the invention can be used advantageously for motor vehicles. In connection with optical sensors, improved measurement accuracy can be achieved using the vehicle pane according to the invention.

In another coordinate aspect, a method for producing a vehicle pane according to the invention or a motor vehicle according to the invention with a vehicle pane is provided, wherein at least one of the second zones of the first and/or second printed region is implemented as a transition region between the first zone and the third zone such that at least one optical effect of the first printed region is compensated by an optical effect of the second printed region.

During the course of the production method of a vehicle pane according to the invention, the bending behavior is dependent on the heat absorption of the vehicle window. The heat absorption can be adjusted or configured using printing or black printing of local regions of the pane elements of a vehicle pane. In particular, for this, the density or intensity of the printing with individual elements, the shaping of the individual elements, the design as a completely printed surface, or the like can be varied such that there is a specific, individually designed surface section.

The bending behavior of a vehicle pane can be influenced by a specific, individual design of a printed region, in particular in individual local areas. Thus, even optical effects or properties of the resulting vehicle pane, such as distortions, in particular the refractive power of the vehicle pane, can be substantially configured through the design of the first and second printed region.

Also, in the sense of the method according to the invention, all the above explained embodiments of a vehicle pane according to the invention or of a vehicle according to the invention in the context of the production method according to the invention can be implemented or made available.

Thus, a completely or almost completely distortion-free vehicle pane can be provided using the method according to the invention.

The invention is explained in the following with reference to the accompanying figures.

Figure 2:
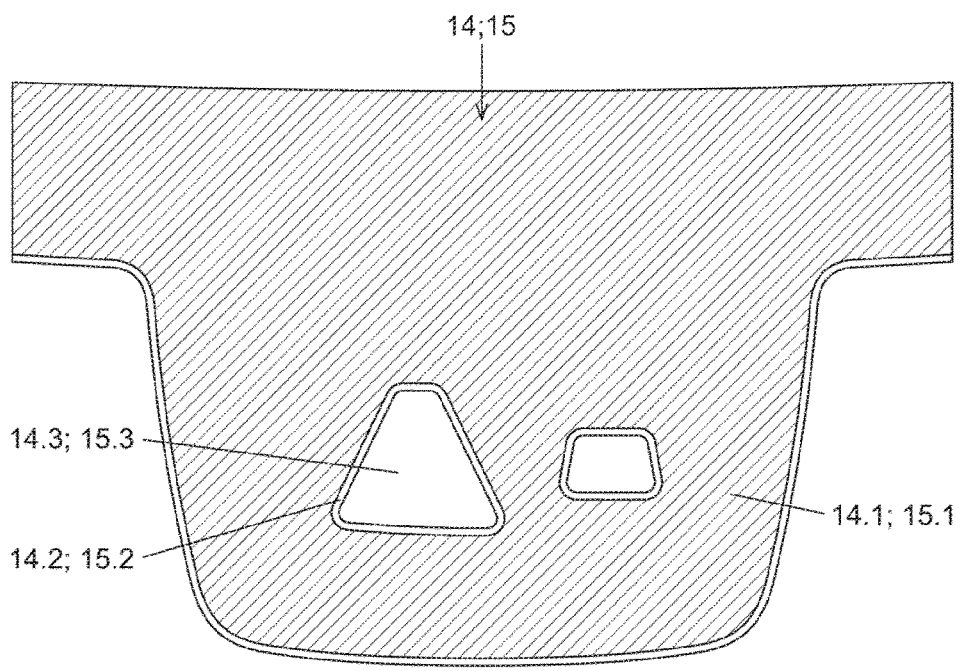
Figure 3:
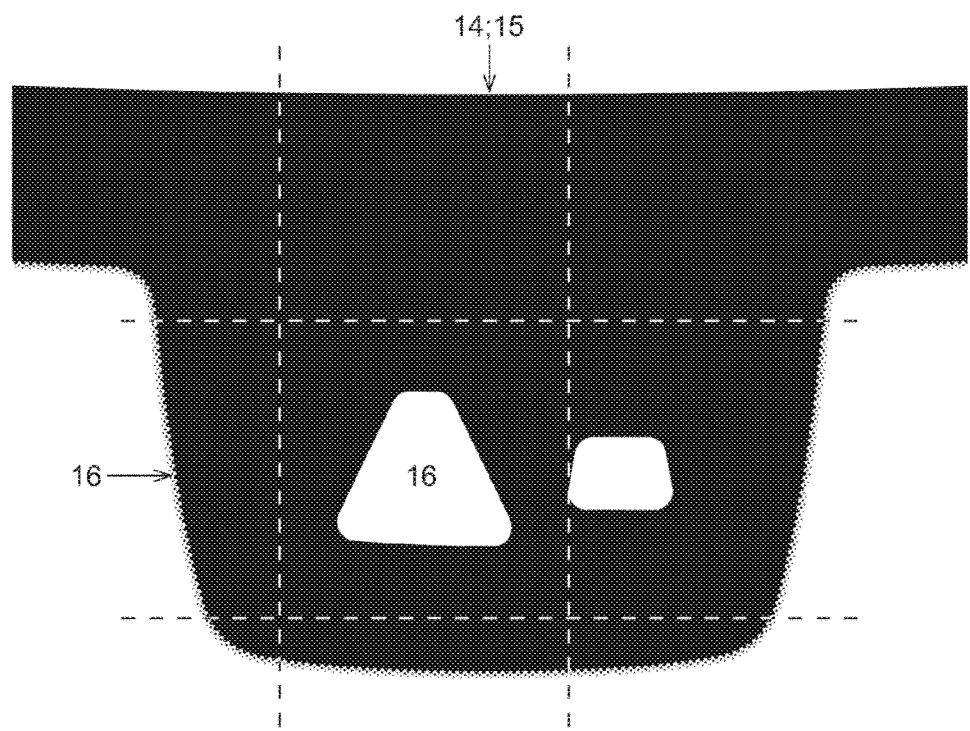

They depict, schematically:

FIG. 1 an overview of a vehicle pane having a first and a second pane element;

FIG. 2 a view of the zone division of the first printed region along the second pane face of the first pane element;

FIG. 3 a view of the viewing region of the optical sensor along the first and second printed region;

FIG. 3a-3d various exemplary embodiments for designing the first printed region along the first pane element;

FIG. 4a-4e various exemplary embodiments for designing the second printed region along the second pane element.

FIG. 1 depicts an overview of a vehicle pane 10 having a first and a second pane element 11; 12.

The first and second pane element 11; 12 are preferably arranged surface-to-surface atop one another. In particular, the pane elements can be laminated in accordance with customary production methods for vehicle panes. Thus, a laminating layer (not shown in FIG. 1) is preferably provided between the first and second pane element 11; 12.

The first pane element 11 has a first and a second pane face 11.1; 11.2. The first pane face 11.1 is preferably an outward directed pane face, whereas the second pane face of the first pane element 11 is preferably opposite the laminating layer.

In this sense, the first pane element 11 is the outer part of the vehicle pane 10.

The second pane element 12 provides a third and a fourth pane face 12.3; 12.4. The third pane face 12.3 is preferably opposite the laminating layer not shown in FIG. 1. Thus, the second pane face 11.2 of the first pane element 11 and the third pane face 12.3 of the second pane element 12 are arranged next to one another.

The fourth pane face 12.4 of the second pane element 12 is preferably a pane face directed inward, i.e., into the interior of a vehicle.

A first printed region 14 is provided along the second pane face 11.2, with a second printed region 15 arranged along the fourth pane face 12.4. The printed regions 14; 15 refer in particular to those surface sections of the pane elements 11; 12 or pane faces 11.2; 12.4, in which at least one sensor, in particular one optical sensor, is arranged.

Alternatively, a printed region, as depicted in FIG. 1 for the first printed region 14, can refer to a surface section of the pane elements 11; 12, that is relevant, for example, for a vehicle driver.

In the context of the exemplary explanation of the present invention with regard to the use of a sensor or a sensor arrangement, the first printed region 14 per FIG. 1 refers primarily to a region designed centrally along the upper side edge of the second pane face 11.2. A second printed region 15 refers in particular to a surface region arranged centrally along the upper side edge of the fourth pane face 12.4.

Considering the application of the present invention with regard to a vehicle driver, the first printed region 14 per FIG. 1 can alternatively refer to the entire second pane face 11.2, with the second printed region 15 referring to an entire fourth pane face 12.4.

According to FIG. 1, the first and second printed regions 14; 15 have both transparent and black print coated or printed opaque regions or zones. Consequently, provision is made for the at least one optical sensor to be positioned substantially along a transparent part of the printed regions 14; 15 or to execute an optical measurement through transparent sections of the printed regions 14; 15.

According to FIG. 1, the first and second printed region 14; 15 are designed in each case with two transparent regions for coupling sensors. The transparent regions are cylindrical or square along the printed regions 14; 15.

In particular, the transparent regions or zones along the first and second printed region 14; 15 are designed substantially with the same shape.

The transparent regions along the first printed region 14 can have larger dimensions than the transparent regions along the second printed region 15. For example, using the outward directed first printed region 14, an adequate, transparent area for a fan-shaped or conical beam path of a sensor arrangement, as well as, for example, suitable protection against sunlight, can be provided.

Furthermore, it is conceivable for the transparent regions depicted per FIG. 1 to be designed as semitransparent surface regions or the like. In particular, this can be the case with the use of infrared sensors or other sensors that operate with electromagnetic radiation in the nonvisible wavelength range.

The transparent sections of the first and second printed region 14; 15 shown in FIG. 1 illustrate, in this sense, in particular the coupling regions of two sensors along the fourth pane face 12.4 or along the second pane element 12.

FIG. 2 illustrates a view over a zone division of the first printed region 14 along the second pane face 11.2 of the first pane element 11.

According to FIG. 2, the printed regions 14; 15 have in each case a first zone 14.1, 15.1, two second zones 14.2; 15.2, and two third zones 14.3; 15.3. Such zones have different optical properties in each case.

The third zone 14.3; 15.3 describes the surface sections along which at least one optical sensor or the sensor arrangement is coupled to the fourth pane face 12.4.

The first zone 14.1; 15.1 describes the surface regions surrounding the sensor arrangement, which are designed as black print according to FIG. 1.

Such a black print of the first zone 14.1 of the first printed region 14 can serve as a screen and as protection against external electromagnetic radiation. Thus, for example, aging effects due to sunlight and the like can be prevented.

According to FIG. 2, two second zones 14.2; 15.2 are also implemented along the first or second printed region 14; 15. Accordingly, the second zone 14.2; 15.2 surrounds or frames the third zone 14.3; 15.3 completely in each case.

In this sense, the second zone 14.2; 15.2 is a transition region between the first zone 14.1; 15.1 and the associated third zone 14.3; 15.3 of the respective printed region 14; 15.

FIG. 3 depicts a view over the viewing region 16 of the optical sensor along the first printed region 14, in particular with a commonly used screen print.

In the context of the present invention, the viewing region 16 of a sensor can describe the surface region of a vehicle pane that can exert an influence on the preferably optical measurement. Alternatively, the viewing region 16 can describe that surface region of a vehicle pane 10 that can influence the optical conditions for a vehicle driver, for example.

FIG. 3 depicts a viewing region 16 of a sensor in the form of the printed regions 14; 15. A region drawn by dashed lines in the shape of a square is used by way of example in the following in FIGS. 3a to 3d and 4a to 4e with regard to the design of the printed regions 14; 15.

An adaption or preferably individual adaptation of the optical properties of the vehicle pane 10 is relevant in particular along the viewing region 16. Provision is, for example, made for the printed regions 14; 15 in each case to be at least partially or completely printed with an individually designed black print.

In deviation from FIG. 3, the viewing region 16 can also be defined with a different geometric shape, e.g., circular or hexagonal. The formation of the relevant viewing region can depend on the shape of the vehicle pane, the type of sensor coupled thereto, the environmental conditions that act on the window, or the like.

In addition, the optical properties of the viewing region 16 are determined by the combination of the expedient, specific implementations of the first and second printed region 14; 15.

FIG. 3a through 3d depict various exemplary embodiments for forming the first printed region 14 along the first pane element 11.

Figure 3A:
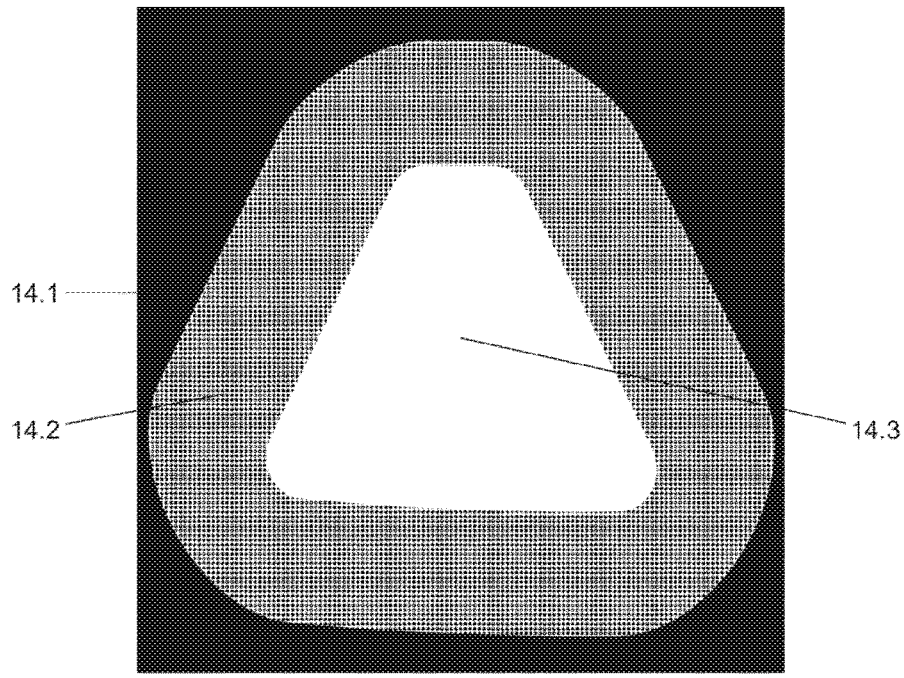

According to FIG. 3a, the first zone 14.1 of the first pane element 11 is designed continuously printed by black print, with the third zone 14.3 transparent, i.e., not printed.

The second zone 14.2 completely surrounds the third zone 14.3 according to FIG. 3a such that the second zone 14.2 forms a frame. Thus, the second zone 14.2 is a transition region between the first and the third zone 14.1; 14.3.

The second zone ist is printed, according to FIG. 3a, with a pattern of individual elements. Preferably, the individual elements are implemented as black print. The individual elements have a square shape. According to FIG. 3a, the pattern is implemented as a uniform, continuous pattern of square individual elements.

Figure 3B:
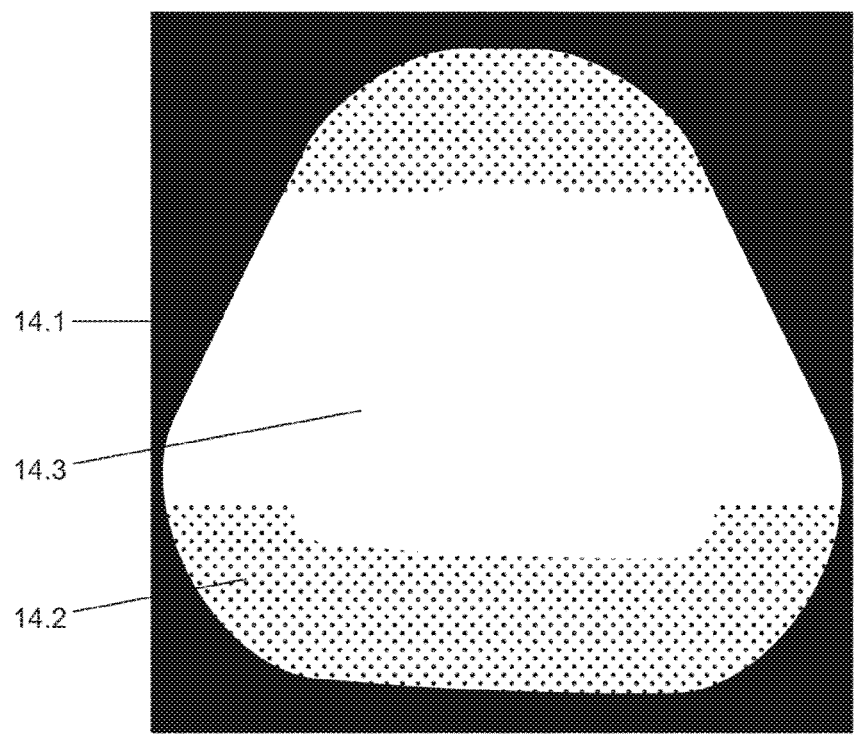

According to FIG. 3b, the second zone 14.2 is only partially printed with a pattern of individual elements. The remainder of the second zone 14.2 is implemented identical to the first zone 14.1.

Thus, the exemplary embodiment according to FIG. 3b can be regarded as the second zone 14.2 being implemented partially isolated and only integrated into the first zone 14.1 in sections.

The second zone 14.2 is implemented as a pattern of individual elements at a pointed side end and a flat side end of the truncated cylindrical third zone 14.3.

The third zone 14.3 can, deviating from a truncated cylindrical geometry, also have a different configuration. The truncated cylindrical geometry of the third zones 14.3; 15.3 is, in the sense of FIG. 3a through 3d and FIG. 4a through 4e, to be understood merely as an exemplary design.

The individual elements of the pattern of the second zone 14.2 have, according to FIG. 3b, a circular geometry.

In summary, the second zone 14.2 of the first printed region 14 can be designed based on need and expediently in terms of its printing as well as its geometric dimensions.

In this sense, the second zone 14.2 can be designed only locally isolated in order to provide a transition region between the first zone and the third zone 14.3. The same can be true as needed for the zones 15.1; 15.2; 15.3 of the second printed region 15.

Figure 3C:
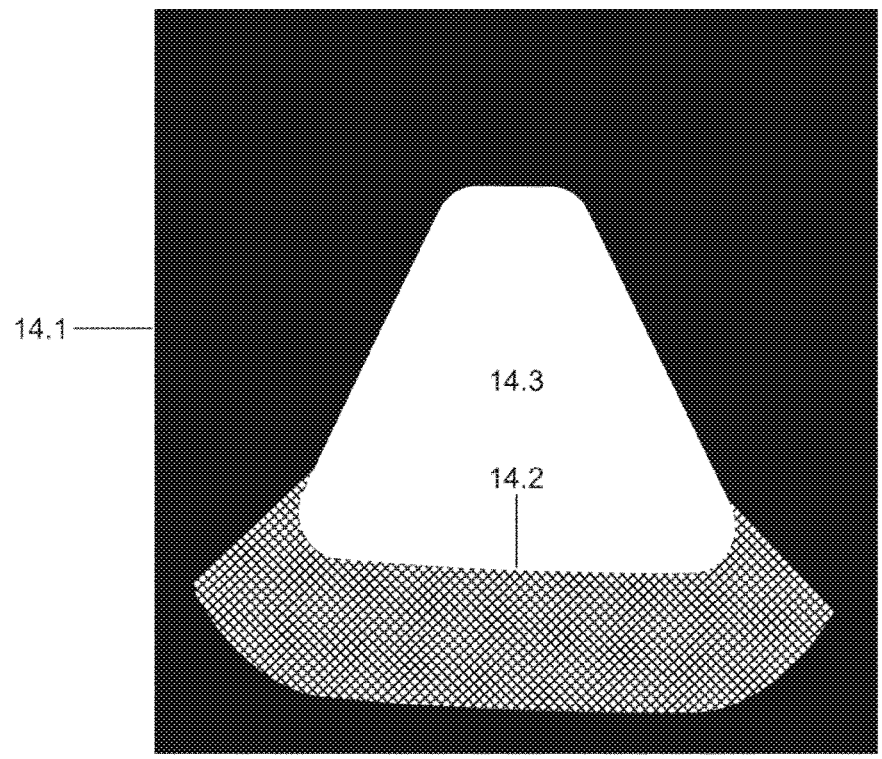

In FIG. 3c, the second zone 14.2 is provided along a flat side end of the truncated cylindrical third zone 14.3. In particular, the second zone 14.2 is designed in sections as a pattern of individual elements in the form non-printed regions and partially integrated into the first zone 14.1.

Figure 3D:
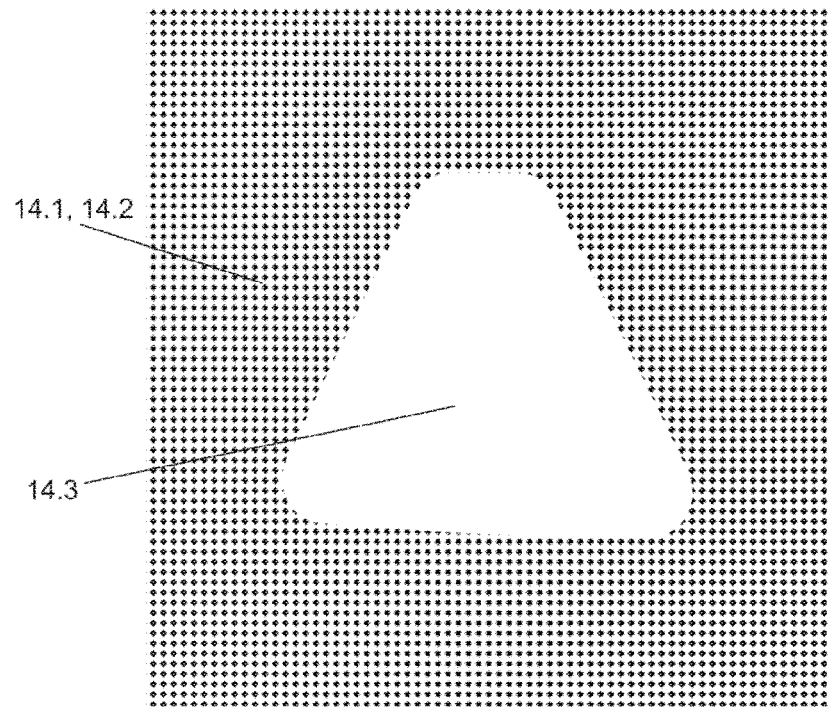

In FIG. 3d, a first zone 14.1 is provided as a pattern of printed individual elements, wherein the second zone 14.2 can be regarded as integrated into the first zone 14.1. In this sense, the second zone 14.2 is provided completely integrated into the first zone 14.1.

The first and second zone 14.1; 14.2 completely surround the truncated cylindrical third zone 14.3.

FIG. 4a through 4e depict various exemplary embodiments for designing the second printed region 15 along the second pane element 12.

With regard to the designs of the first, second, and third zone 15.1; 15.2; 15.3 of the second printed region 15, the same options are applicable as already explained above for the first printed region 14.

Figure 4A:
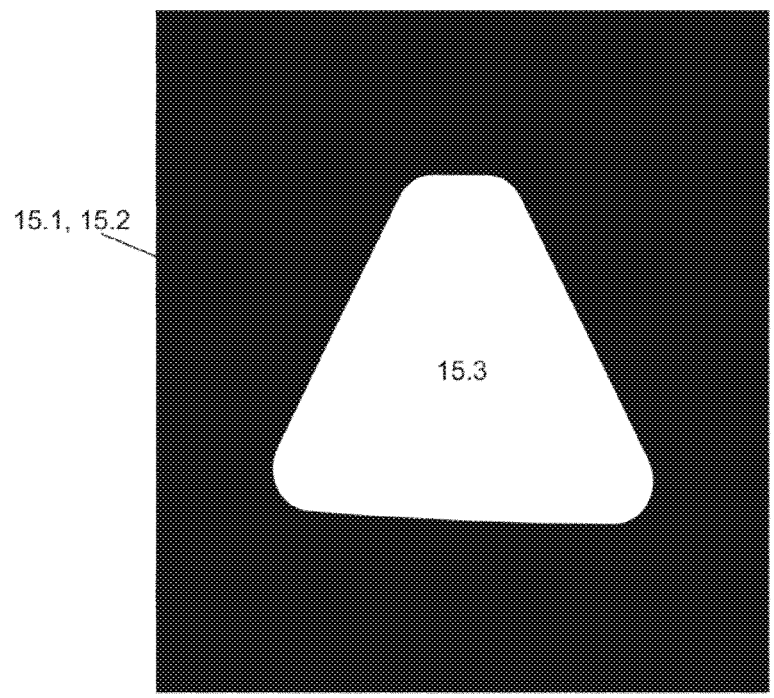

According to FIG. 4a, the first zone 15.1 is designed as a continuous black print, wherein the third zone 15.3 is not printed and is thus transparent.

The second zone 15.2 can be considered integrated into the first zone 15.1.

In general, the second zones 14.2; 15.2 in the context of the present invention can be, as needed in each case, designed identical to the first zones 14.1; 15.1 or integrated therein. In such a case, a transition region is formed as a second zone 14.2; 15.2 between the first and third zone 14.1; 14.3; 15.1; 15.3, in the context of the present invention, in particular, directly along the boundary with the transparent third zone 14.3; 15.3.

An individual and expedient design of the first and second printed region 14; 15 is provided with first, second, and third zones 14.1; 14.2; 14.3; 15.1; 15.2; 15.3, in order to provide a suitable combination of pane elements elementen 11; 12 for compensating optical effects, in particular in a viewing region 16 of an optical sensor.

Figure 4B:
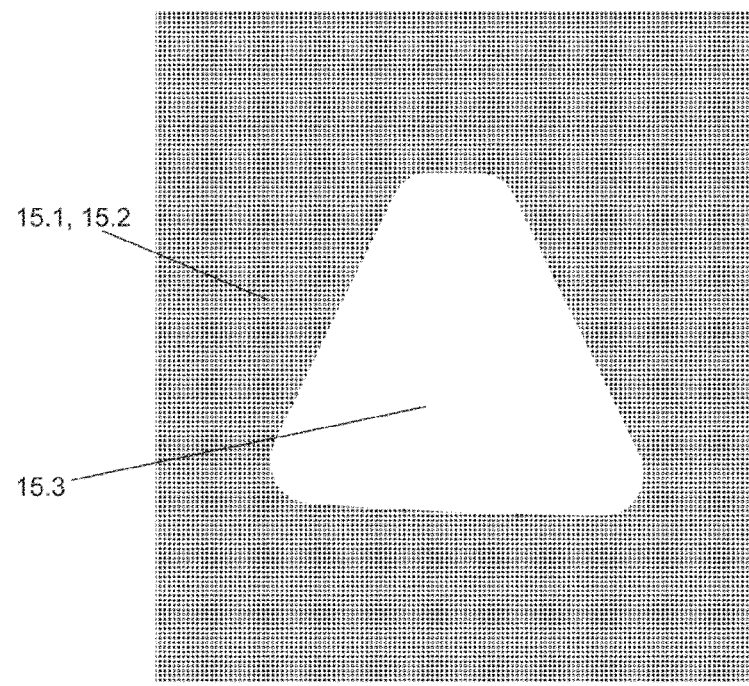

According to FIG. 4b, the first zone is printed with a pattern of individual elements, wherein the individual elements have a circular shape.

The second zone 15.2 is shown integrated into the first zone 15.1.

Figure 4C:
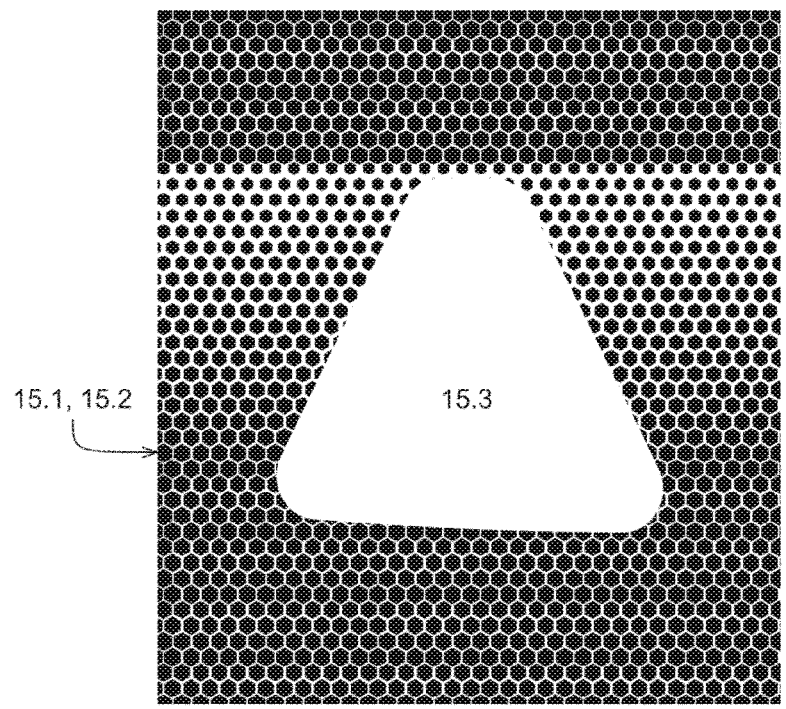

In FIG. 4c, the second zone 15.2 is likewise provided as integrated into the first zone 15.1.

The first zone 15.1 is designed as a pattern of individual elements, wherein the individual elements have a hexagonal shape.

According to FIG. 4c, the first zone 15.1 is provided with a gradient pattern.

The gradient pattern is implemented in the form of varying sizes of the hexagonal individual elements. In particular, the size of the hexagonal individual elements varies along the course from the flat truncated cylindrical end of the third zone 15.3 in the direction of the tapering end of the truncated cylindrical third zone 15.3.

Instead of a simple, uniformly designed pattern of individual elements, a gradient pattern can always be provided in the sense of the present invention, wherein the size of the individual elements, the shape of the pattern, the distances between the individual elements, or comparable features of the printing can change.

Figure 4D:
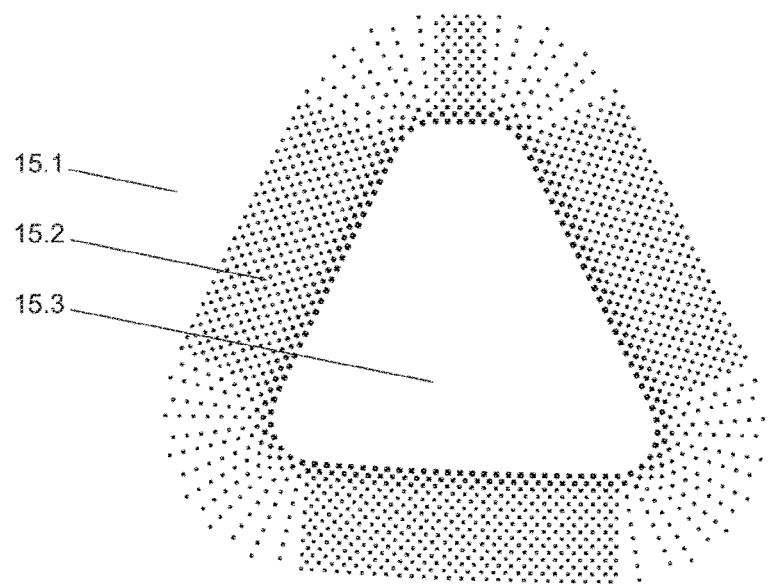

In FIG. 4d, the first zone 15.1 of the second printed region 15 is formed identical to the third zone 15.3 as non-printed or transparent.

The second zone 15.2 frames the third zone 15.3 completely. The second zone 15.2 is designed with a circumferential gradient pattern made up of square individual elements.

The gradient pattern is in particular designed such that rows of individual elements are spread out along the rounded edges of the third zone 15.3. Thus, along the rounded corners of the third zone 15.3, there is a lower density of individual elements within the second zone 15.2.

Figure 4E:
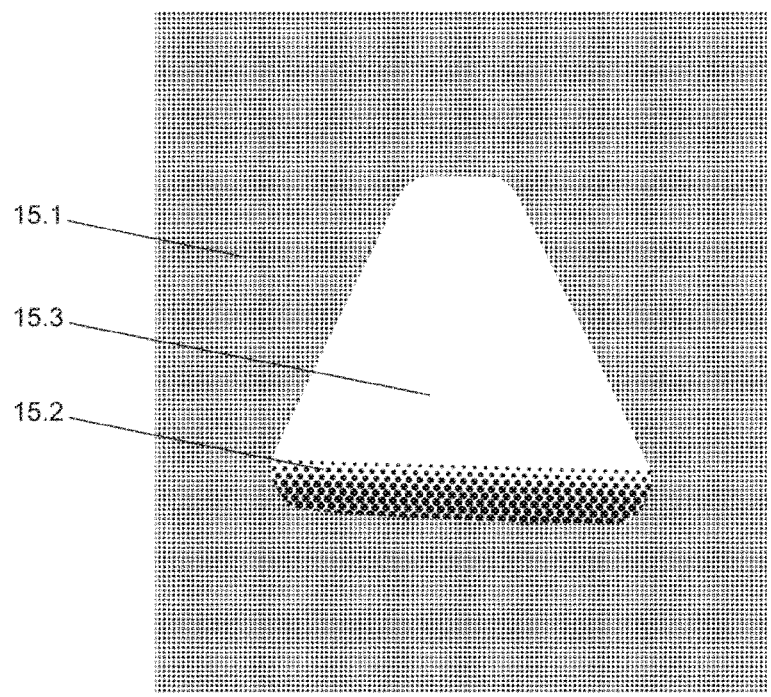

According to FIG. 4e, the first zone 15.1 printed or designed with a uniform pattern of circular individual elements.

The second zone 15.2 is provided along the flat side end of the truncated cylindrical third zone 15.3 as a gradient pattern of individual elements.

The individual elements have substantially a circular geometry, with the individual elements overlapping in places. A partially serpentine pattern is obtained.

Apart from the blunt or flat side end of the third zone 15.3, the second zone 15.2 is integrated as in the first zone 15.1 or designed identical thereto. Thus, according to FIG. 4e, the second zone 15.2 contrasts only at the blunt or flat side end in isolation from the third zone 15.3.

The third zones 14.3; 15.3 are always delimited or designed as a transparent section of the first or second printed region 14; 15 such that a vehicle driver, an optical sensor, or the like can see through the transparent third region 15.3.

In general, a combination of specifically designed first and second printed regions 14; 15 can be provided by arranging the first and second pane elements 11; 12 to compensate optical effects or properties of individual pane elements 11, 12.

In particular, the respective second zone 14.2; 15.2 can be designed, as needed, as a transition region between the first and third zones 14.1; 14.3; 15.1; 15.3.

Thus, a vehicle pane 10 that has advantageous optical properties for use with at least one sensor or one sensor arrangement can be provided.

LIST OF REFERENCE CHARACTERS

10 vehicle pane
11 first pane element
11.1 first pane face
11.2 second pane face
12 second pane element
12.3 third pane face
12.4 fourth pane face
14 first printed region
14.1 first zone (of the first printed region)
14.2 second zone (of the first printed region)
14.3 third zone (of the first printed region)
15 second printed region
15.1 first zone (of the second printed region)
15.2 second zone (of the second printed region)
15.3 third zone (of the second printed region)
16 viewing region

The invention claimed is:

1. A vehicle pane including at least a first pane element and a second pane element that are joined to one another surface-to-surface such that the vehicle pane has a first pane face, a second pane face, a third pane face, and a fourth pane face, wherein the second pane face has a first printed region, the first printed region being printed on the second pane face, and the third or fourth pane face has a second printed region, the second printed region being printed on the third or fourth pane face, for forming a viewing region along the vehicle pane, wherein each of the first and second printed region is designed with at least a first, second, and third zone, wherein at least one of the first and second zones of the first printed region is at least partially printed, and at least one of the first and second zones of the second printed region is at least partially printed, and the third zones of the first and second printed regions are, not printed, wherein each of the second zones is implemented as a transition region between the first zone and the third zone such that at least one optical effect of the first printed region can be compensated by an optical effect of the second printed region.

2. The vehicle pane according to claim 1, wherein a refractive power as an optical property of the first pane element in the first printed region is compensated by a refractive power as an optical property of the second pane element in the second printed region.

3. The vehicle pane according to claim 1, wherein the first zone of the first printed region is printed continuously or with a pattern of individual elements.

4. The vehicle pane according to claim 1, wherein the second zone of the first printed region is designed at least partially as a pattern of printed individual elements.

5. The vehicle pane according to claim 1, wherein the first zone of the second printed region is printed continuously or with a pattern of individual elements or is not printed.

6. The vehicle pane according to claim 1, wherein the second zone of the second printed region is designed at least partially as a pattern of individual elements.

7. The vehicle pane according to claim 1, wherein the first zone and/or the second zone of the first printed region and/or of the second printed region are designed at least partially identical to the respective associated third zone.

8. The vehicle pane according to claim 1, wherein the pattern of individual elements of the first zone and/or of the second zone of the second printed region is a gradient pattern.

9. The vehicle pane according to claim 1, wherein the first and second zones of the first and second printed region are implemented in the form of a black print.

10. The vehicle pane according to claim 1, wherein the first printed region and the second printed region are designed in each case as a screen print.

11. The vehicle pane according to claim 1, wherein individual elements for a printed pattern made up of individual elements have the geometric shape of a circle, a rectangle, a square, a rhombus, a hexagon, an octahedron, or the like.

12. A vehicle having a vehicle pane according to claim 1.

13. A method for producing a vehicle pane or a vehicle having a vehicle pane according to claim 1, wherein at least one of the second zones of the first and/or second printed region is implemented as a transition region between the first zone and the third zone such that at least one optical effect of the first printed region is compensated by an optical effect of the second printed region.

14. The vehicle pane according to claim 1, wherein the vehicle pane is a vehicle pane of a motor vehicle, a bus, a train, or a ship.

15. The vehicle according to claim 12, wherein the vehicle is a motor vehicle.

16. The vehicle according to claim 15, wherein the vehicle is a passenger car, a truck, a bus, a train, or a ship.

\* \* \* \* \*